(12) United States Patent
Xu et al.

(10) Patent No.: US 10,157,143 B2
(45) Date of Patent: *Dec. 18, 2018

(54) FILE ACCESS METHOD AND APPARATUS, AND STORAGE SYSTEM

(71) Applicant: Huawei Technologies Co., Ltd., Shenzhen (CN)

(72) Inventors: Jun Xu, Hangzhou (CN); Guanyu Zhu, Shenzhen (CN); Qun Yu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 45 days.

This patent is subject to a terminal disclaimer.

(21) Appl. No.: 15/445,542

(22) Filed: Feb. 28, 2017

(65) Prior Publication Data

US 2017/0168953 A1 Jun. 15, 2017

Related U.S. Application Data

(63) Continuation of application No. PCT/CN2014/085660, filed on Sep. 1, 2014.

(51) Int. Cl.
*G06F 12/00* (2006.01)
*G06F 12/1009* (2016.01)
(Continued)

(52) U.S. Cl.
CPC .......... *G06F 12/1009* (2013.01); *G06F 9/545* (2013.01); *G06F 12/08* (2013.01); *G06F 2212/1024* (2013.01)

(58) Field of Classification Search
None
See application file for complete search history.

(56) References Cited

U.S. PATENT DOCUMENTS

| 4,742,447 A | 5/1988 | Duvall et al. |
| 4,742,450 A | 5/1988 | Duvall et al. |

(Continued)

FOREIGN PATENT DOCUMENTS

| CN | 86108127 A | 7/1987 |
| CN | 1517906 A | 8/2004 |

(Continued)

OTHER PUBLICATIONS

Loius Alex Eisner et al., "Quill: Exploiting Fast Non-Volatile Memory by Transparently Bypassing the File System", 2013, 6 pages.

(Continued)

*Primary Examiner* — Kaushikkumar M Patel

(57) ABSTRACT

A file access method and apparatus, and a storage system are provided. After receiving a file access request including a file identifier, first physical address space is accessed according to first virtual address space and a first mapping relationship between the first virtual address space and the first physical address space storing a file system. After obtaining, from the first physical address space, an index node of an object file indicated by the file identifier, a file page table is obtained according to information included in the index node, where the file page table records second physical address space of the object file. Then, second virtual address space is allocated to the object file. After establishing a second mapping relationship between the second physical address space and the second virtual address space, the object file in the second physical address space is accessed according to the second virtual address space.

15 Claims, 9 Drawing Sheets

(51) Int. Cl.
*G06F 9/54* (2006.01)
*G06F 12/08* (2016.01)

(56) References Cited

U.S. PATENT DOCUMENTS

| | | | |
|---|---|---|---|
| 5,873,120 | A | 2/1999 | Harvey et al. |
| 8,204,871 | B1 | 6/2012 | Pawar et al. |
| 8,495,750 | B2 | 7/2013 | Rosu |
| 8,543,792 | B1 | 9/2013 | Glasco et al. |
| 8,645,665 | B1 | 2/2014 | Bennett et al. |
| 8,935,353 | B1 * | 1/2015 | Masputra ............... H04L 67/06 709/212 |
| 9,146,765 | B2 | 9/2015 | Starks et al. |
| 2005/0209991 | A1 | 9/2005 | Rogers et al. |
| 2005/0246401 | A1 | 11/2005 | Edwards et al. |
| 2006/0075404 | A1 * | 4/2006 | Rosu ..................... G06F 9/4881 718/100 |
| 2010/0199040 | A1 | 8/2010 | Schnapp et al. |
| 2011/0317763 | A1 | 12/2011 | Takada |
| 2014/0115021 | A1 * | 4/2014 | Chen ................. G06F 17/30138 707/829 |
| 2014/0129814 | A1 | 5/2014 | Bi et al. |

FOREIGN PATENT DOCUMENTS

| | | |
|---|---|---|
| CN | 101075211 A | 11/2007 |
| CN | 101382953 A | 3/2009 |
| CN | 101707565 A | 5/2010 |
| CN | 101882132 A | 11/2010 |
| CN | 101901263 A | 12/2010 |
| CN | 102300089 A | 12/2011 |
| CN | 102707900 A | 10/2012 |
| CN | 103218312 A | 7/2013 |
| CN | 103218321 A | 7/2013 |
| CN | 103748565 A | 4/2014 |
| EP | 0229691 A2 | 7/1987 |
| EP | 2733616 A1 | 5/2014 |
| JP | S62165251 A | 7/1987 |
| JP | 2014517941 A | 7/2014 |
| WO | 2012098211 A1 | 7/2012 |

OTHER PUBLICATIONS

Joel Coburn et al., "NV-Heaps: Making Persistent Objects Fast and Safe with Next-Generation, Non-Volatile Memories", ASPLOS'11, Mar. 5-11, 2011, 13 pages.

* cited by examiner

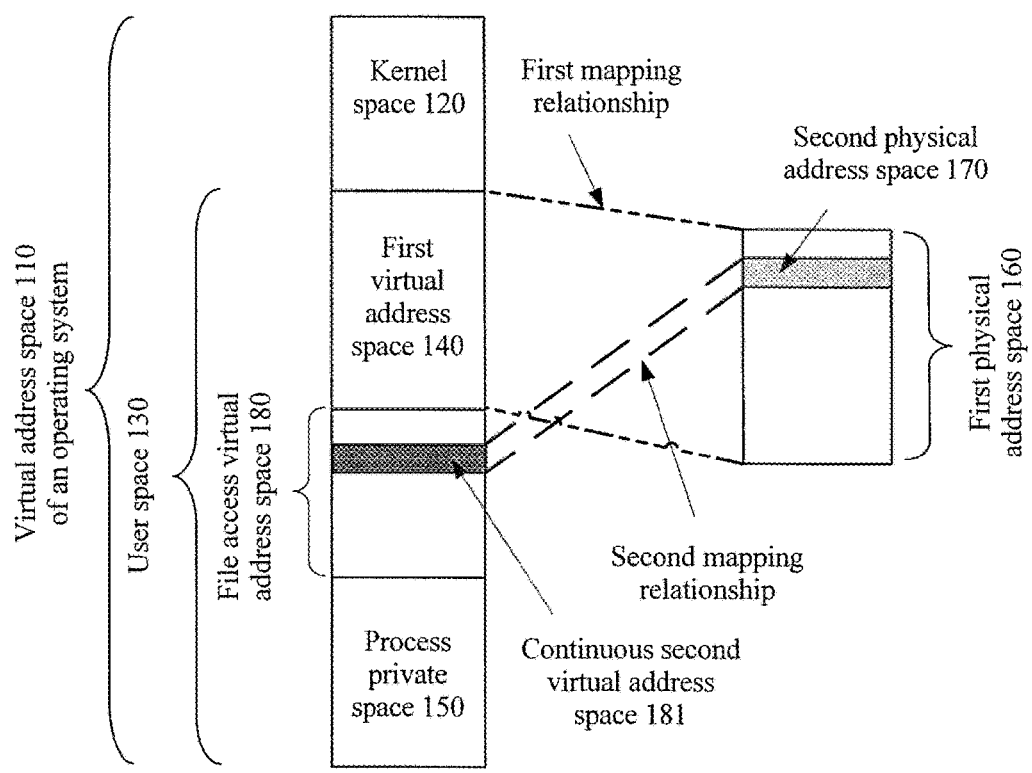
FIG. 1-a

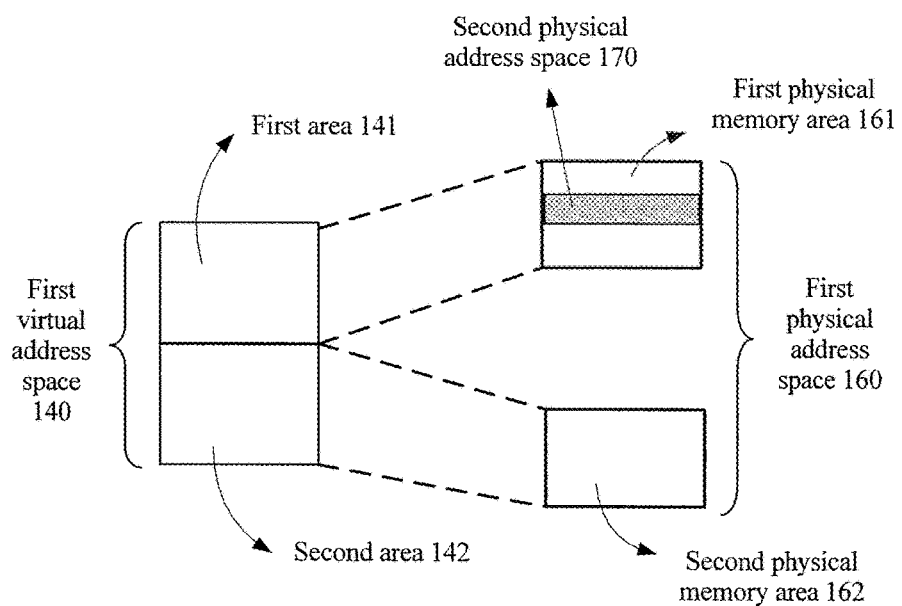
FIG. 1-b

FILE ACCESS METHOD AND APPARATUS, AND STORAGE SYSTEM

CROSS-REFERENCE TO RELATED APPLICATIONS

This application is a continuation of International Application No. PCT/CN2014/085660, filed on Sep. 1, 2014, the disclosure of which is hereby incorporated by reference in its entirety.

TECHNICAL FIELD

Embodiments of the present disclosure relate to the computer field, and more specifically, to a file access method and apparatus, and a storage system.

BACKGROUND

In a conventional technology, a file system can be accessed only in kernel space. When a process needs to access an object file in the file system, a system call needs to be performed to switch the process from user space to the kernel space, so as to access the object file. This manner affects a file access speed and causes relatively large software running overheads.

Therefore, a method for directly accessing a file in the user space needs to be provided.

SUMMARY

Embodiments of the present disclosure provide a file access method and apparatus, and a storage system, so that a file can be accessed in user space with relatively low software running overheads.

According to a first aspect, a file access method is provided, where the method includes:

receiving a file access request from a process, where the file access request includes a file identifier, and the file identifier is used to indicate a to-be-accessed object file;

accessing first physical address space according to preset first virtual address space and a preset first mapping relationship between the first virtual address space and the first physical address space storing a file system, where the first virtual address space is a part of user space of an operating system, and the first physical address space is a part of memory space;

obtaining, from the first physical address space, an index node of the object file according to the file identifier of the object file, where the index node includes information about a file page table of the object file;

obtaining the file page table of the object file according to the information that is about the file page table of the object file and included in the index node, where the file page table records second physical address space of a data page that is of the object file and stored in the first physical address space, and the data page of the object file is used to store file data;

allocating second virtual address space to the object file, where the second virtual address space is a part of sharing space that is in the user space of the operating system and allocated to all processes, and the second virtual address space is continuous address space;

establishing a second mapping relationship between the second physical address space and the second virtual address space; and accessing the object file in the second physical address space according to the second virtual address space and the second mapping relationship.

With reference to the first aspect, in a first possible implementation manner of the first aspect, the establishing a second mapping relationship between the second physical address space and the second virtual address space includes:

establishing the second mapping relationship by linking the file page table of the object file to a process page table corresponding to the second virtual address space.

With reference to the first aspect or the first possible implementation manner of the first aspect, in a second possible implementation manner of the first aspect, the second virtual address space is greater than the second physical address space; and the accessing the object file in the second physical address space according to the second virtual address space and the second mapping relationship includes:

performing a read operation on the object file in the second physical address space according to the second virtual address space and the second mapping relationship; and ending the read operation when a virtual address corresponding to data to be read during the read operation exceeds virtual address space corresponding to the object file.

With reference to the first aspect or the first possible implementation manner of the first aspect, in a third possible implementation manner of the first aspect, the second virtual address space is greater than the second physical address space; and the accessing the object file in the second physical address space according to the second virtual address space and the second mapping relationship includes:

performing a write operation on the object file in the second physical address space according to the second virtual address space and the second mapping relationship; and ending the write operation when a virtual address corresponding to data to be written during the write operation exceeds the second virtual address space.

With reference to any one of the first aspect, or the first to the third possible implementation manners of the first aspect, in a fourth possible implementation manner of the first aspect, the method further includes:

establishing, in kernel space, the first mapping relationship between the first virtual address space and the first physical address space, and storing, in a process page table corresponding to the kernel space, a mapping page table corresponding to the first mapping relationship; and after the file access request is received from the process, the method further includes:

determining that a process page table corresponding to the first virtual address space does not record the first mapping relationship; and linking, to the process page table corresponding to the first virtual address space, the mapping page table that is stored in the kernel space and corresponding to the first mapping relationship.

According to a second aspect, a file access apparatus is provided, where the apparatus includes:

a receiving module, configured to receive a file access request from a process, where the file access request includes a file identifier, and the file identifier is used to indicate a to-be-accessed object file;

a first access module, configured to access first physical address space according to preset first virtual address space and a preset first mapping relationship between the first virtual address space and the first physical address space storing a file system, where the first virtual address space is a part of user space of an operating system, and the first physical address space is a part of memory space;

an obtaining module, configured to obtain, from the first physical address space, an index node of the object file according to the file identifier that is of the object file and received by the receiving module, where the index node includes information about a file page table of the object file, where the obtaining module is further configured to obtain the file page table of the object file according to the information that is about the file page table of the object file and included in the index node, where the file page table records second physical address space of a data page that is of the object file and stored in the first physical address space, and the data page of the object file is used to store file data;

an allocation module, configured to allocate second virtual address space to the object file, where the second virtual address space is a part of sharing space that is in the user space of the operating system and allocated to all processes, and the second virtual address space is continuous address space;

a first establishment module, configured to establish a second mapping relationship between the second physical address space and the second virtual address space allocated by the allocation module; and a second access module, configured to access the object file in the second physical address space according to the second virtual address space allocated by the allocation module and the second mapping relationship established by the first establishment module.

With reference to the second aspect, in a first possible implementation manner of the second aspect, the first establishment module is specifically configured to establish the second mapping relationship by linking the file page table of the object file to a process page table corresponding to the second virtual address space.

With reference to the second aspect or the first possible implementation manner of the second aspect, in a second possible implementation manner of the second aspect, the second virtual address space allocated by the allocation module is greater than the second physical address space; and the second access module is specifically configured to:
perform a read operation on the object file in the second physical address space according to the second virtual address space and the second mapping relationship; and
end the read operation when a virtual address corresponding to data to be read during the read operation exceeds virtual address space corresponding to the object file.

With reference to the second aspect or the first possible implementation manner of the second aspect, in a third possible implementation manner of the second aspect, the second virtual address space allocated by the allocation module is greater than the second physical address space; and the second access module is specifically configured to:
perform a write operation on the object file in the second physical address space according to the second virtual address space and the second mapping relationship; and
end the write operation when a virtual address corresponding to data to be written during the write operation exceeds the second virtual address space.

With reference to any one of the second aspect, or the first to the third possible implementation manners of the second aspect, in a fourth possible implementation manner of the second aspect, the apparatus further includes:

a second establishment module, configured to establish, in kernel space, the first mapping relationship between the first virtual address space and the first physical address space, and store, in a process page table corresponding to the kernel space, a mapping page table corresponding to the first mapping relationship;

a determining module, configured to: after the receiving module receives the file access request from the process, determine that a process page table corresponding to the first virtual address space does not record the first mapping relationship; and a linking module, configured to link, to the process page table corresponding to the first virtual address space, the mapping page table that is stored in the kernel space and corresponding to the first mapping relationship established by the second establishment module.

According to a third aspect, a storage system is provided, where the storage system includes:

a memory, configured to store a file and a program; and
a processor, configured to execute the program to:
receive a file access request from a process, where the file access request includes a file identifier, and the file identifier is used to indicate a to-be-accessed object file;

access first physical address space according to preset first virtual address space and a preset first mapping relationship between the first virtual address space and the first physical address space storing a file system, where the first virtual address space is a part of user space of an operating system, and the first physical address space is a part of memory space;

obtain, from the first physical address space, an index node of the object file according to the file identifier of the object file, where the index node includes information about a file page table of the object file;

obtain the file page table of the object file according to the information that is about the file page table of the object file and included in the index node, where the file page table records second physical address space of a data page that is of the object file and stored in the first physical address space, and the data page of the object file is used to store file data;

allocate second virtual address space to the object file, where the second virtual address space is a part of sharing space that is in the user space of the operating system and allocated to all processes, and the second virtual address space is continuous address space;

establish a second mapping relationship between the second physical address space and the second virtual address space; and access the object file in the second physical address space according to the second virtual address space and the second mapping relationship.

With reference to the third aspect, in a first possible implementation manner of the third aspect, the processor is specifically configured to establish the second mapping relationship by linking the file page table of the object file to a process page table corresponding to the second virtual address space.

With reference to the third aspect or the first possible implementation manner of the third aspect, in a second possible implementation manner of the third aspect, the second virtual address space is greater than the second physical address space; and the processor is specifically configured to:
perform a read operation on the object file in the second physical address space according to the second virtual address space and the second mapping relationship; and
end the read operation when a virtual address corresponding to data to be read during the read operation exceeds virtual address space corresponding to the object file.

With reference to the third aspect or the first possible implementation manner of the third aspect, in a third possible implementation manner of the third aspect, the second virtual address space is greater than the second physical address space; and the processor is specifically configured to:

perform a write operation on the object file in the second physical address space according to the second virtual address space and the second mapping relationship; and end the write operation when a virtual address corresponding to data to be written during the write operation exceeds the second virtual address space.

With reference to any one of the third aspect, or the first to the third possible implementation manners of the third aspect, in a fourth possible implementation manner of the third aspect, the processor is further configured to:

establish, in kernel space, the first mapping relationship between the first virtual address space and the first physical address space, and store, in a process page table corresponding to the kernel space, a mapping page table corresponding to the first mapping relationship;

after the file access request is received from the process, determine that a process page table corresponding to the first virtual address space does not record the first mapping relationship; and link, to the process page table corresponding to the first virtual address space, the mapping page table that is stored in the kernel space and corresponding to the first mapping relationship.

According to the file access method and apparatus, and the storage system in the embodiments of the present disclosure, second physical address space that is in first physical address space and stores an object file may be determined according to first virtual address space and a first mapping relationship between the first virtual address space of user space and the first physical address space storing a file system. Continuous second virtual address space is allocated to the object file. Then, a second mapping relationship between the second physical address space and the second virtual address space is established. The object file is accessed according to the second virtual address space and the second mapping relationship. Therefore, a case in which a system call is frequently generated during file access in the prior art is avoided, and the file can be directly accessed in the user space, thereby avoiding that the system call is frequently generated during file access in the prior art. This can effectively reduce software running overheads during file access and improve a file access speed.

BRIEF DESCRIPTION OF THE DRAWINGS

To describe technical solutions in embodiments of the present disclosure more clearly, the following briefly describes the accompanying drawings required for describing the embodiments.

FIG. 1-*a* is a schematic diagram of virtual address space in an operating system according to an embodiment of the present disclosure;

FIG. 1-*b* is another schematic diagram of virtual address space in an operating system according to an embodiment of the present disclosure;

DETAILED DESCRIPTION

Figure 2:
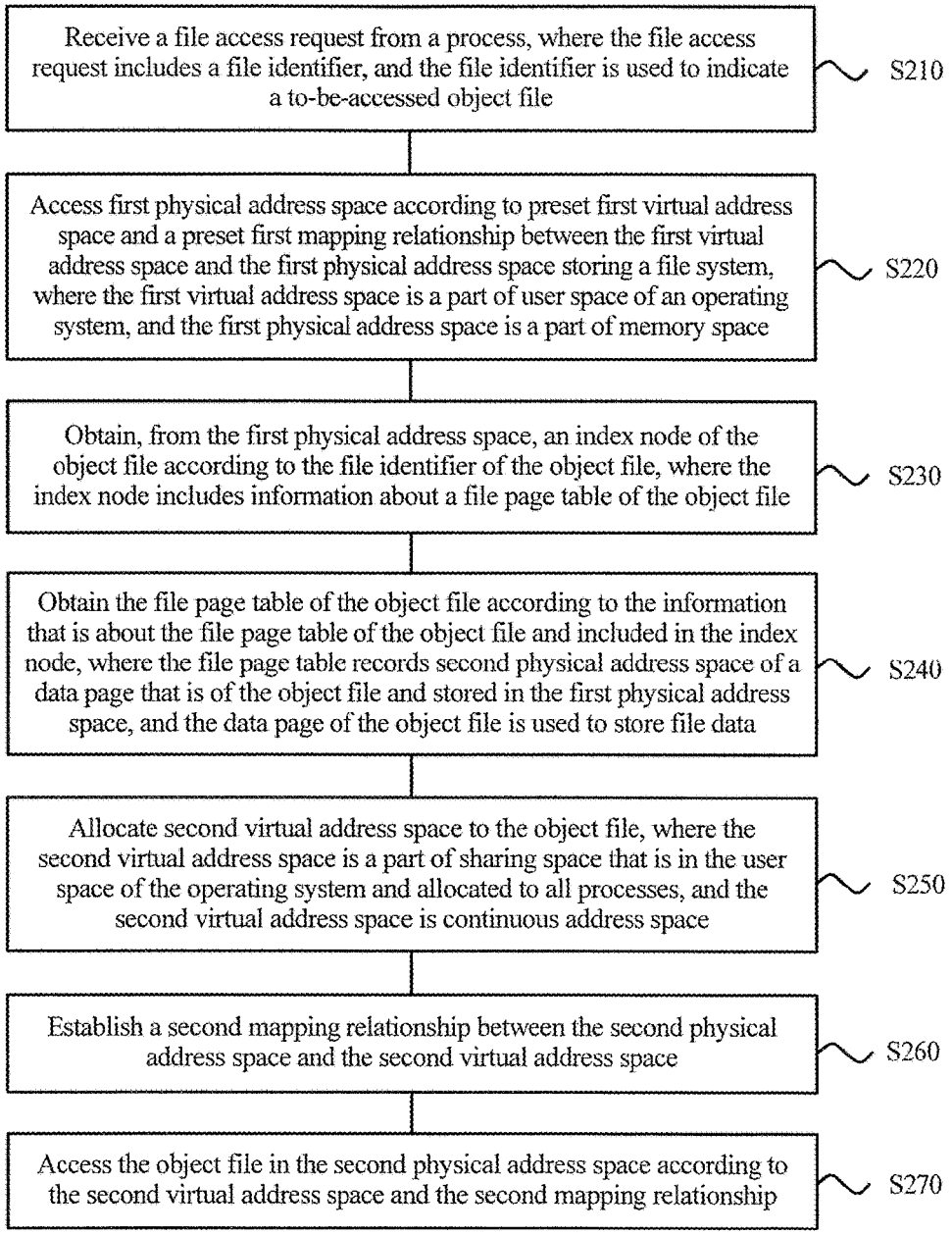
FIG. 2 is a schematic flowchart of a file access method according to an embodiment of the present disclosure.

The following clearly describes the technical solutions in the embodiments of the present disclosure with reference to the accompanying drawings in the embodiments of the present disclosure. Apparently, the described embodiments are some rather than all of the embodiments of the present disclosure.

To facilitate understanding of the embodiments of the present disclosure, several related concepts are first described herein.

1. File System

Software that is in an operating system and used to store and manage file data is referred to as a file system. The file system is used to store and organize data, and define a file access policy. The data in the file system is divided into metadata and data. The data refers to actual data in a common file. The metadata refers to system data used to describe a file feature. The metadata (for example, an inode) may include, for example, access permission, a file owner, and file data block distribution information. When a user needs to operate a file, the user first needs to obtain metadata of the file to locate the file and obtain content or a related attribute of the file. The metadata is data of data. In the file system field, each file is corresponding to one metadata structure. The structure includes a file attribute such as a file creation time, a file modification time, a file access time, a file owner, permission, or mapping information.

In the file system, there are three important data structures: a file, an inode, and a dentry. The following briefly describes the three important data structures.

(1) File Object "File"

The file structure indicates an open file object (in the system, each open file is corresponding to one file structure in kernel space), and is created in a kernel during an open operation and released during a close operation.

(2) File Index Node Object "Inode"

In the kernel, a file is indicated using the inode structure different from the file structure. The file structure indicates an open file descriptor. For one file, there may be many file structures that indicate open file descriptors, but all the file structures point to a unique inode.

(3) File Directory Object "Dentry"

In the kernel, one dentry structure is created for a component of each path name for which a process searches. For example, when a path name /dev/test is searched for, in the kernel, a dentry structure is created for a root directory "/", a two-level dentry structure is created for dev, and a three-level dentry structure is created for test.

A conventional file system runs in a kernel mode. When a user process needs to access a file in the file system, the user process needs to access the file using a system call.

2. System Call

The system call is a common means for communication between the kernel space and user space. The system call may be considered as a group of "special interfaces" provided by the operating system for a user program to call. The user program may obtain, using the group of "special interfaces", a system service provided by the operating system kernel. For example, the user program may request, using a system call related to the file system, the system to open a file, close a file, or read/write a file. A basic reason why the system service needs to be provided for the user space using the system call is to "protect" the system, because Linux running space is divided into the kernel space and the user space, and the kernel space and the user space separately run at different levels and are logically isolated from each other. Generally, the process (running in the user space) is not allowed to access kernel data and cannot use a kernel function, but can only operate user data or invoke a user function. When the process needs to access the kernel data (for example, access a file), the process accesses the kernel data using the "special interfaces" provided by the system for the user, that is, using the system call. Specifically, a request of the process is conveyed to the kernel, after the request is processed in the kernel space, a processing result is returned to the user space (which is equivalent to being returned to the process).

3. User Space and Kernel Space

The Linux running space is divided into the kernel space (which may be also referred to as a kernel mode) and the user space (which may be also referred to as a user mode). The kernel space and the user space separately run at different levels and are logically isolated from each other.

In the prior art, virtual address space of an operating system is divided into two parts: user space (whose running environment may be referred to as a user mode) and kernel space (whose running environment may be referred to as a kernel mode). The user space is private virtual address space of a process. The process runs in the user space. The kernel space is specifically used to manage a system resource. When a process needs to access a resource (for example, access a file), the process needs to apply to a kernel for a resource using a system call. To avoid that a system call is frequently generated when the process requests to access a file, the present disclosure provides a file access method and apparatus, and a storage system, so as to effectively reduce software running overheads during file access.

To facilitate understanding of the technical solutions provided in the embodiments of the present disclosure, the following describes an application scenario of the embodiments of the present disclosure with reference to FIG. 1-*a* and FIG. 1-*b*.

As shown in FIG. 1-*a*, virtual address space 110 of an operating system includes kernel space 120 and user space 130. The user space 130 specifically includes first virtual address space 140, file access virtual address space 180, and process private space 150. The first virtual address space 140 and the file access virtual address space 180 are space shared by all processes, that is, all the processes have permission to access the first virtual address space 140 and the file access virtual address space 180 in the user space 130. The process private space 150 is private space of each process. The process private space 150 may be also referred to as process activity space. There is a first mapping relationship (as shown in FIG. 1-*a*) between the first virtual address space 140 and first physical address space 160. The first physical address space 160 is physical address space corresponding to a storage area that is in physical memory space and stores a file system. For example, as shown in FIG. 1-*a*, the file system includes an object file. Address space that is in the first physical address space 160 and used to store the object file is second physical address space 170. Specifically, a process page table corresponding to the first virtual address space 140 records the first mapping relationship. The file access virtual address space 180 is a continuous segment of address space, and is used to map a to-be-accessed object file. For example, as shown in FIG. 1-*a*, second virtual address space 181 of the file access virtual address space 180 is a continuous segment of virtual address space allocated to the to-be-accessed object file. There is a second mapping relationship between the second virtual address space 181 and the second physical address space 170 in which the object file is located. In this way, the object file may be continuously accessed in the user space.

Specifically, for example, when a process needs to access the object file shown in FIG. 1-*a*, based on the first mapping relationship, the process may access the first physical address space using the first virtual address space; locates, in the first physical address space, the second physical address space 170 storing the object file; and allocates the continuous second virtual address space 181 in the file access virtual address space 180 to the object file, and establishes the second mapping relationship between the second virtual address space 181 and the second physical address space 170. In this way, the process may continuously access the object file in the user space according to the second virtual address space 181. Therefore, in the technical solutions provided in the embodiments of the present disclosure, any process that needs to access an object file in the file system may continuously access the object file in the user space using the first virtual address space 140, the first mapping relationship, the second virtual address space 181, and the second mapping relationship, so as to avoid a frequent system call during file access in the prior art. This can reduce software running overheads and improve a file access speed.

Optionally, the first mapping relationship between the first virtual address space 140 and the first physical address space 160 may be a linear mapping relationship, so as to facilitate access to the first physical address space 160.

It should be understood that the process private space 150 provided in FIG. 1-*a* as an example may represent private space of any process. The schematic block diagram shown in FIG. 1-*a* does not constitute a specific limitation on the embodiments of the present disclosure.

The first physical address space 160 in FIG. 1-*a* is physical address space corresponding to a memory area that is in a physical memory and used to store the file system. Further, as shown in FIG. 1-*b*, the first physical address space 160 used to store the file system may be further divided into a first physical memory area 161 used to store metadata and data of the file system and a second physical memory area 162 used to store cached data generated when the file system runs. The cached data generated when the file system runs specifically refers to data generated in a process in which a process accesses a file, for example, a file object "file", a file index node object "inode", a file directory object "dentry", and a file descriptor (which may be also referred to as a "handle"). It should be understood that (as shown in FIG. 1-*b*) the second physical address space 170 that is in the first physical address space 160 and used to store the object file falls within the first physical memory area 161. Optionally, the first physical memory area 161 and the second physical memory area 162 may be discontinuous in terms of a physical address.

As shown in FIG. 1-*b*, because there is the first mapping relationship between the first virtual address space 140 and the first physical address space 160, for the two areas obtained by dividing the first physical address space 160, the first virtual address space 140 may also correspondingly include two areas: a first area 141 and a second area 142. A mapping area that is in the first virtual address space 140 and of the first physical memory area 161 is the first area 141, and a mapping area that is in the first virtual address space 140 and of the second physical memory area 162 is the second area 142. It should be understood that the process may access the first physical memory area 161 and the second physical memory area 162 by respectively accessing the first area 141 and the second area 142, so as to access the metadata and the data of the file system and the cached data generated when the file system runs. It should be understood that mapping address space that is in the first virtual address space 140 and of the second physical address space 170 storing the object file falls within the first area 141.

It may be understood that dividing the first physical address space 160 into the two areas in the foregoing is merely an example. In actual application, the first physical address space 160 may be divided into multiple areas according to an actual need. Certainly, in actual application, the first virtual address space 140 may be also divided into multiple areas according to an actual need. This is not limited herein.

In this embodiment of the present disclosure, in a case, both the first physical memory area 161 and the second physical memory area 162 may use a nonvolatile storage (NVM) medium, such as a phase change memory (PCM), a resistive random access memory (ReRAM), a magnetic random access memory (MRAM), or another non-volatile storage medium that has a read/write feature similar to that of a DRAM and that can be attached to a memory bus for access. In another case, the first physical memory area 161 may use a nonvolatile memory medium, and specifically, use, for example, a wear-resistant dynamic random access storage (DRAM) medium; and the second physical memory area 162 may use a volatile memory medium.

It should be further understood that a file access method 200 in an embodiment of the present disclosure may be executed by a controller or a central processing unit (CPU).

Figure 4A:
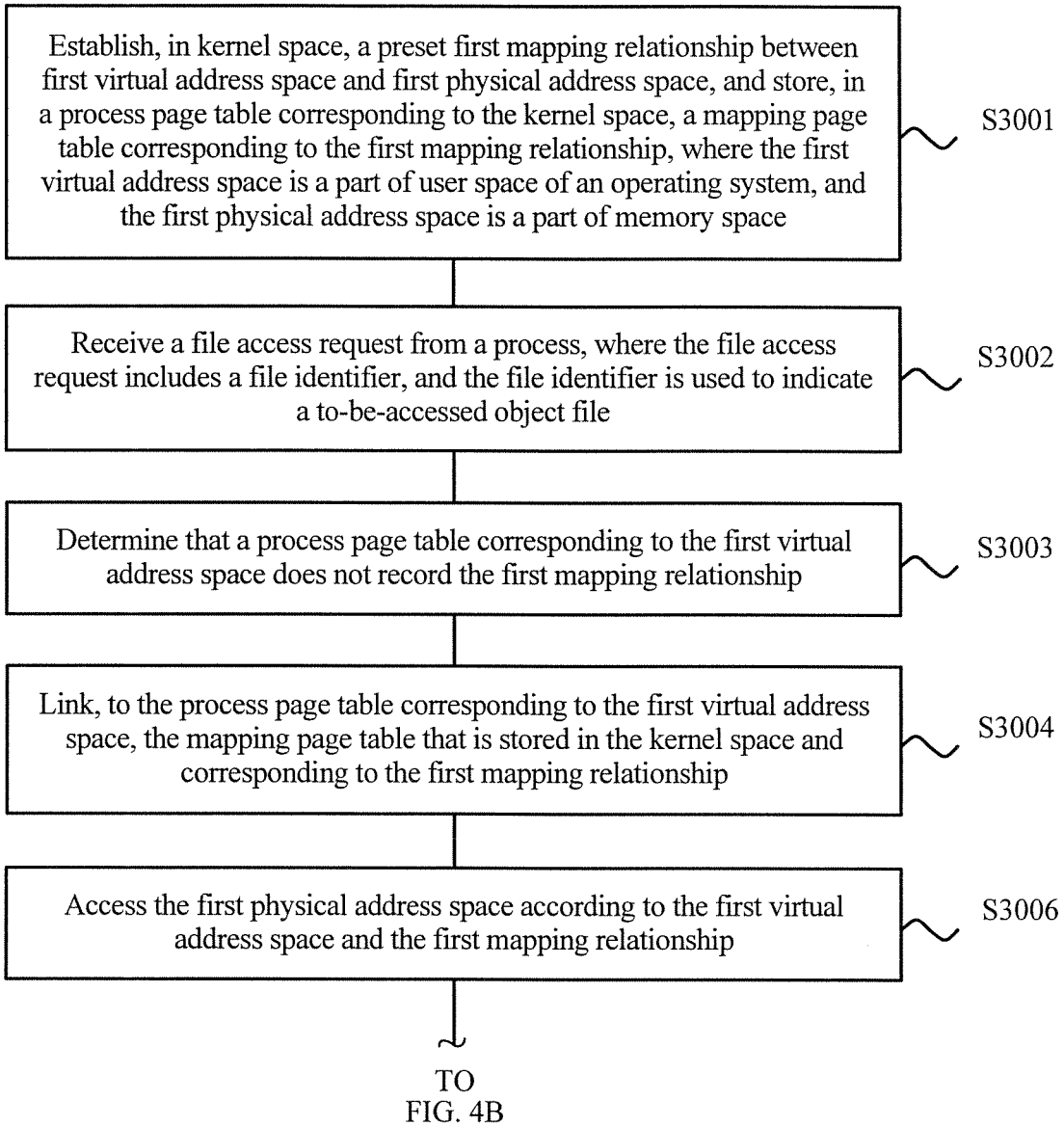
FIG. 4A and FIG. 4B are a schematic flowchart of another file access method according to an embodiment of the present disclosure.
Figure 4B:
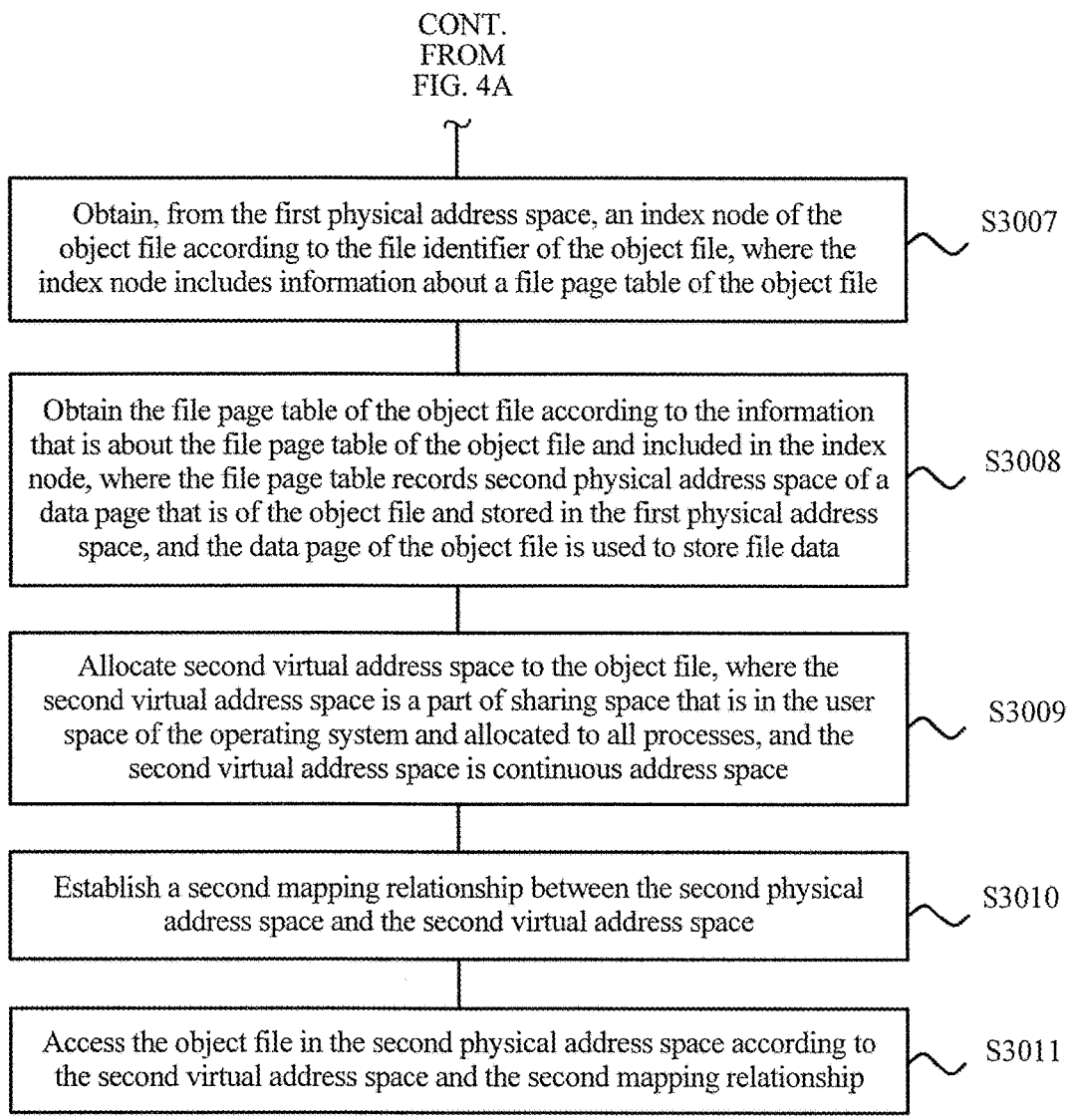

The following describes in detail the file access method provided in the embodiments of the present disclosure with reference to FIG. 2, FIG. 4A, and FIG. 4B. FIG. 2 is a schematic flowchart of a file access method according to an embodiment of the present disclosure. It should be noted that a file access request of a process is used as an example in FIG. 2 for description. It may be understood that the method 200 may be applied to any scenario in which a process requests to access a file. As shown in FIG. 2, the method 200 includes the following steps.

S210. Receive a file access request from a process, where the file access request includes a file identifier, and the file identifier is used to indicate a to-be-accessed object file.

Specifically, the file identifier may include a storage path of the object file, a file type (a directory file or a data file) of the object file, and the like. It should be understood that the file access request may be specifically an access request such as a file open request, a file read request, or a file write request.

S220. Access first physical address space according to preset first virtual address space and a preset first mapping relationship between the first virtual address space and the first physical address space storing a file system, where the first virtual address space is a part of user space of an operating system, and the first physical address space is a part of memory space.

Optionally, in this embodiment of the present disclosure, the accessing first physical address space according to preset first virtual address space and a preset first mapping relationship between the first virtual address space and the first physical address space storing a file system in S220 includes the following steps:

S221. Access the first virtual address space according to the file access request.

S222. Determine that a process page table corresponding to the first virtual address space records the first mapping relationship between the first virtual address space and the first physical address space storing the file system.

S223. Access the first physical address space according to the first virtual address space and the first mapping relationship.

Further, the first mapping relationship is a linear mapping relationship. Therefore, a first address of the first physical address space is corresponding to a first address of the first virtual address space, and a correspondence of the following address is obtained by analogy. This facilitates access to the first physical address space.

S230. Obtain, from the first physical address space, an index node of the object file according to the file identifier of the object file, where the index node includes information about a file page table of the object file.

Optionally, in this embodiment of the present disclosure, the obtaining, from the first physical address space, an index node of the object file according to the file identifier of the object file in S230 includes the following steps:

S231. Determine, according to the file identifier of the object file, whether the first physical address space stores the to-be-accessed object file indicated by the file identifier.

S232. Obtain the index node of the object file when it is determined that the first physical address space stores the to-be-accessed object file indicated by the file identifier.

S233. When it is determined that the first physical address space does not store the to-be-accessed object file indicated by the file identifier, create the object file in the first physical address space and allocate an index node to the object file, where the index node allocated to the object file includes the information about the file page table of the object file, and the file page table is used to point to second physical address space in which the object file created in the first physical address space is located.

It should be understood that each file in the file system is corresponding to one index node (inode). Therefore, an index node corresponding to an object file can be obtained provided that it is determined that the first physical address space in which the file system is located stores the object file. It should be further understood that the first physical address space may store the object file by default. In this scenario, a related step of determining whether the first physical address space stores the object file may be omitted.

Figure 3:
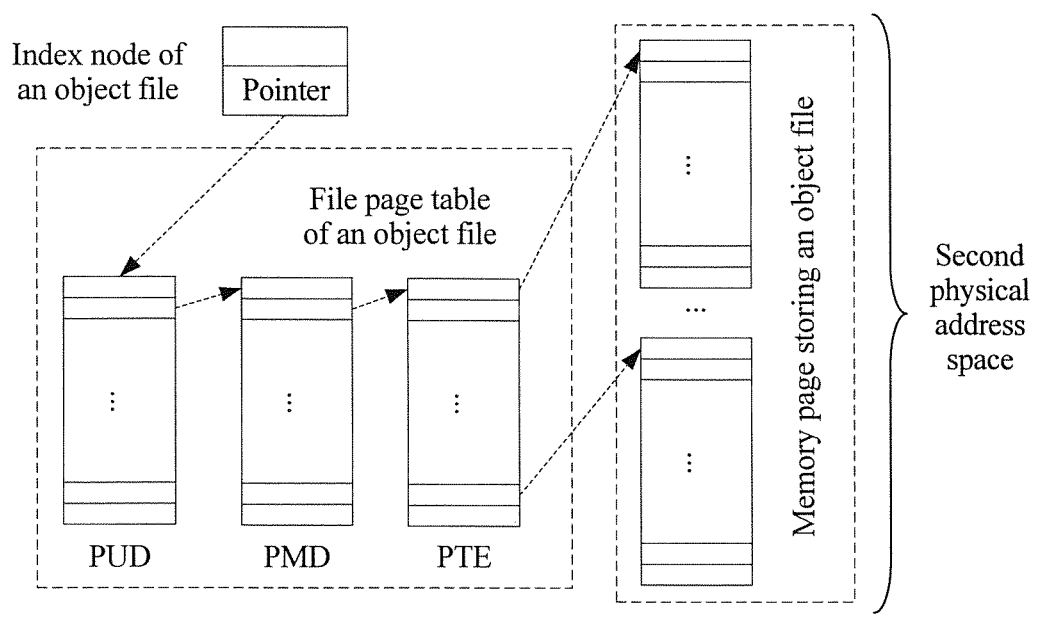
FIG. 3 is a schematic diagram of a file page table according to an embodiment of the present disclosure.

The index node includes the information about the file page table of the object file. Specifically, the index node may include information that can be used to obtain the second physical address space that is in the first physical address space and stores a memory page of the object file. For example, the index node of the object file may record the file page table (FPT) of the object file or a pointer used to point to the file page table of the object file. Specifically, as shown in FIG. 3, an index node of an object file includes a pointer used to point to a file page table. The pointer specifically stores a highest-level file page table (PUD) of the object file.

S240. Obtain the file page table of the object file according to the information that is about the file page table of the object file and included in the index node, where the file page table records second physical address space of a data page that is of the object file and stored in the first physical address space, and the data page of the object file is used to store file data.

Specifically, the file page table of the object file is used to point to the physical address of the memory page that is in the first physical address space and stores the object file. Therefore, the second physical address space in which the object file is located may be located according to the file page table of the object file.

Optionally, in this embodiment of the present disclosure, the file page table of the object file and the process page table have a similar or same data structure.

It should be understood that in the prior art, the process page table is used by a process in an operating system in a protection mode, and indicates a relationship of mapping from virtual space of the process to physical space of the process. For a given to-be-accessed virtual address, an MMU locates, in a current process page table according to the virtual address, a process page table entry corresponding to the virtual address, and then parses the page table entry to obtain an actual physical address, so as to implement access. According to different addressing space of the operating system, there may be 32-bit addressing space whose space size is $2^{32}$ bytes or 64-bit addressing space whose space size is $2^{64}$ bytes. A common process page table may be also classified into a three-level page table or a four-level page table. The four-level page table includes a PGD, a PUD, a PMD, and a PTE. The three-level page table uses a manner of being compatible with the four-lever page level, that is, the three-level page table namely also includes a PGD, a PUD, a PMD, and a PTE. The PUD and the PMD are page tables at a same level. A current-level page table includes a start physical address pointing to a next-level page table, and a lowest-level page table PTE includes a start physical address pointing to a specific physical page.

The file page table in this embodiment of the present disclosure and the process page table may have a same or similar structure. Specifically, the file page table may be a one-level or multi-level page table. Each table entry of each-level page table in non-lowest-level page tables records a start physical address of a next-level page table. Each table entry of a lowest-level page table records a start physical address of a memory page storing a file. Specifically, as shown in FIG. 3, for example, the file page table of the object file in FIG. 3 is a three-level file page table including a PUD, a PMD, and a PTE. Each table entry of the PUD records a start physical address of one PMD, each table entry of the PMD records a start physical address of one PTE, and each table entry of the PTE records a start physical address of one memory page (the memory page stores file content of the object file). It should be understood that not every file needs to use a three-level file page table. Even though a three-level file page table is used, a format may be not fixed. For example, not every file needs to use 1024 PTEs, and an organizational architecture of a file page table may be dynamically adjusted according to a change in a file size.

In FIG. 3, an example in which the index node of the object file records the pointer pointing to the highest-level file page table PUD (for example, a start physical address of the PUD) of the three-level file page table is used for description. It may be further understood that the index node of the object file may directly store the second physical address space that is in the first physical address space and stores the object file, a start address of the second physical address space, or the like. The information recorded in the index node of the object file is not specifically limited herein, provided that related information about the second physical address space of the object file can be obtained according to the information recorded in the index node of the object file.

It should be understood that the example shown in FIG. 3 is used to help a person skilled in the art to better understand this embodiment of the present disclosure, but is not intended to limit the scope of this embodiment of the present disclosure. Apparently, a person skilled in the art may perform various equivalent modifications or changes according to the example given in FIG. 3, and such modifications or changes also fall within the scope of this embodiment of the present disclosure.

S250. Allocate second virtual address space to the object file, where the second virtual address space is a part of sharing space that is in the user space of the operating system and allocated to all processes, and the second virtual address space is continuous address space.

S260. Establish a second mapping relationship between the second physical address space and the second virtual address space.

Optionally, in this embodiment of the present disclosure, the establishing a second mapping relationship between the second physical address space and the second virtual address space in S260 includes:

establishing the second mapping relationship by linking the file page table of the object file to a process page table corresponding to the second virtual address space.

Specifically, it is assumed that the process page table corresponding to the second virtual address space is an N-level page table, the file page table of the object file is an M-level page table, M≤N, and 0-level to (N−M−1)-level page tables are absent from the file page table. Linking the file page table of the object file to the process page table corresponding to the second virtual address space may specifically refer to: copying an entry of a highest (N−M)-level page table of the file page table to an entry of an (N−M)-level page table of the process page table corresponding to the second virtual address space. The second mapping relationship between the second virtual address space and the second physical address space in which the object file is located may be implemented in this manner. It can be learned from the foregoing that establishing the second mapping relationship in the "linking" manner only needs to copy a highest-level page table entry of the file page table of the object file to a corresponding-level page table entry of the process page table corresponding to the second virtual address space, so that a page table entry after the highest-level ((N−M)-level) page table entry of the file page table of the object file is automatically linked to the process page table corresponding to the second virtual address space. In the "linking" manner, a page table copy amount can be effectively reduced. Therefore, software running overheads can be reduced.

S270. Access the object file in the second physical address space according to the second virtual address space and the second mapping relationship.

Specifically, based on the second mapping relationship between the second virtual address space and the second physical address space in which the object file is located, the second physical address space may be accessed using the continuous second virtual address space, so that the object file can be continuously accessed.

In conclusion, according to the file access method in this embodiment of the present disclosure, second physical address space that is in first physical address space and stores an object file may be determined according to first virtual address space and a first mapping relationship between the first virtual address space of user space and the first physical address space storing a file system. Continuous second virtual address space is allocated to the object file. Then, a second mapping relationship between the second physical address space and the second virtual address space is established. The object file is accessed according to the second virtual address space and the second mapping relationship. Therefore, a case in which a system call is frequently generated during file access in the prior art is avoided, and the file can be directly accessed in the user space, thereby avoiding that the system call is frequently generated during file access in the prior art. This can effectively reduce software running overheads during file access and improve a file access speed.

In this embodiment of the present disclosure, the object file is accessed in the user space according to the second virtual address space. A data page fault does not occur provided that an access address in the second virtual address space does not exceed virtual address space corresponding to the object file. Therefore, a system call does not need to be performed to switch to kernel space, to request to access a resource. That is, in comparison with the prior art, according to the file access method provided in this embodiment of the present disclosure, software running overheads can be effectively reduced and a file access speed can be improved.

The mentioned "virtual address space corresponding to the object file" in the foregoing specifically refers to mapping space obtained by mapping, to the second virtual address space, the second physical address space in which the object file is located. That is, the "virtual address space corresponding to the object file" is a part of the second virtual address space, and there is a mapping relationship between each virtual address in the "virtual address space corresponding to the object file" and a specific physical address (a physical address of a data page of the object file). Therefore, the second physical address space in which the object file is located can be accessed by accessing the "virtual address space corresponding to the object file". The accessing the object file in the second physical address space according to the second virtual address space and the second mapping relationship in S270 may be also described as follows: The object file in the second physical address space is accessed according to the "virtual address space corresponding to the object file" in the second virtual address space and the second mapping relationship.

Optionally, in this embodiment of the present disclosure, the second virtual address space allocated to the object file is greater than or equal to the "virtual address space corresponding to the object file". That is, the second virtual address space allocated to the object file may be greater than or equal to the second physical address space in which the object file is located.

The mentioned "data page fault" in the foregoing indicates that a current access operation is interrupted when the following case occurs: The process page table corresponding to the second virtual address space does not record a mapping relationship between a current access address and a specific physical address, that is, an entry indicating the mapping relationship between the address and the specific physical address is absent from the process page table corresponding to the second virtual address space, and consequently, the physical address cannot be accessed using the address, and current access to the object file is interrupted.

Specifically: 1. If the second virtual address space is equal to the "virtual address space corresponding to the object file", when the object file is accessed using the second virtual address space, an access address certainly does not exceed the "virtual address space corresponding to the object file", and there is the mapping relationship between each virtual address in the "virtual address space corresponding to the object file" and a specific physical address (a physical address of a data page of the object file). Therefore, in the foregoing case, the foregoing "data page fault" does not occur. 2. If the second virtual address space is greater than the "virtual address space corresponding to the object file", when the object file is accessed using the second virtual address space, and when an access address exceeds the "virtual address space corresponding to the object file", the foregoing "data page fault" occurs.

If the second virtual address space is greater than the "virtual address space corresponding to the object file", when a read and/or write operation are/is performed on the object file using the second virtual address space, out-of-bounds access may occur. To avoid a case in which an out-of-bounds read operation causes a read error, in this embodiment of the present disclosure, if the second virtual address space is greater than the second physical address space, the accessing the object file in the second physical address space according to the second virtual address space and the second mapping relationship in S270 may include:

performing a read operation on the object file in the second physical address space according to the second virtual address space and the second mapping relationship; and ending the read operation when a virtual address corresponding to data to be read during the read operation exceeds virtual address space corresponding to the object file.

It should be understood that the "virtual address space corresponding to the object file" in this embodiment is the mentioned mapping space obtained by mapping, to the second virtual address space, the second physical address space in which the object file is located, and is a part of the second virtual address space.

Specifically, a file read instruction used to request to read the file data of the object file is received from the process. The second physical address space is accessed based on the second mapping relationship and using the second virtual address space, to perform the read operation of the object file. The read operation is ended when the virtual address corresponding to the data to be read from the read operation exceeds the virtual address space corresponding to the object file. Specifically, the read operation of the object file is ended when an end read address obtained after a start read address in the second virtual address space is offset by a predetermined read byte length exceeds the "virtual address space corresponding to the object file".

Optionally, in this embodiment of the present disclosure, a file descriptor "fd" of the object file and a file object "file" of the object file may be further created in the second physical memory area 162 (as shown in FIG. 1-*b*) of the first physical address space 160, and an association relationship between the file descriptor "fd" and the file object "file" of the object file is created. The file object "file" is used to record information such as a size of the second virtual address space, a first address obtained by mapping the second physical address space of the object file to the second virtual address space, and a file size of the object file. When a read operation request of the object file is received, the file descriptor fd that is of the object file and in the second physical memory area 162 may be accessed using a virtual address that is in the second area 142 of the first virtual address space (as shown in FIG. 1-*b*) and corresponding to the file descriptor fd of the object file (that is, a mapping address that is in the second area 142 and of a physical address of the file descriptor fd stored in the second physical memory area 162), so as to obtain the information such as the space size of the second virtual address space allocated to the object file, the first address obtained by mapping the second physical address space of the object file to the second virtual address space, and the file size of the object file. Further, the read operation of the object file can be performed using the second virtual address space. According to the file access method in this embodiment of the present disclosure, a problem of an out-of-bounds read operation can be resolved, and access security can be effectively ensured.

To avoid a case in which an out-of-bounds write operation causes a write error, in this embodiment of the present disclosure, if the second virtual address space is greater than the second physical address space, the accessing the object file in the second physical address space according to the second virtual address space and the second mapping relationship in S270 includes:

performing a write operation on the object file in the second physical address space according to the second virtual address space and the second mapping relationship; and ending the write operation when a virtual address corresponding to data to be written during the write operation exceeds the second virtual address space.

Specifically, a file write request that requests to perform the write operation on the object file is received from the process. The second physical address space is accessed based on the second mapping relationship and using the second virtual address space, to perform the write operation of the object file. The write operation is ended when the virtual address corresponding to the data to be written during the write operation exceeds the second virtual address space. Specifically, the write operation of the object file is ended when an end write address obtained after a start write address in the second virtual address space is offset by a predetermined write byte length exceeds the second virtual address space.

Optionally, in this embodiment of the present disclosure, a file descriptor fd of the object file and a file object "file" of the object file may be further created in the second physical memory area 162 of the first physical address space 160 (as shown in FIG. 1-*b*), and an association relationship between the file descriptor fd and the file object "file" of the object file may be created. The file object "file" is used to record information such as a size of the second virtual address space, a first address obtained by mapping the second physical address space of the object file to the second virtual address space, and a file size of the object file. When a write operation request of the object file is received, the file descriptor fd that is of the object file and in the second physical memory area 162 may be accessed using a virtual address that is in the second area 142 of the first virtual address space (as shown in FIG. 1-*b*) and corresponding to the file descriptor fd of the object file (that is, a mapping address that is in the second area 142 and of a physical address of the file descriptor fd stored in the second physical memory area 162), so as to obtain the information such as the space size of the second virtual address space allocated to the object file, the first address obtained by mapping the second physical address space of the object file to the second virtual address space, and the file size of the object file. Therefore, the write operation of the object file can be performed using the second virtual address space.

Optionally, in this embodiment of the present disclosure, a process of performing the write operation on the object file in the second physical address space according to the second virtual address space and the second mapping relationship includes the following steps.

The write operation of the object file is interrupted when it is determined that an entry that records a mapping physical address, in the first physical address space, of a current write address is absent from the process page table corresponding to the second virtual address space, and the current write address exceeds the virtual address space corresponding to the object file;

a third physical address in the first physical address space is allocated to the object file, and an entry used to record a mapping relationship between the current write address and the third physical address is added to the process page table corresponding to the second virtual address space; and the third physical address is accessed using the current write address and based on the mapping relationship recorded by the foregoing added entry in the process page table corresponding to the second virtual address space, and the write operation of the object file is further performed.

According to the file access method in this embodiment of the present disclosure, a file write operation range can be enlarged, a problem of out-of-bounds access can be resolved, and access security can be effectively ensured.

In this embodiment of the present disclosure, second virtual address space is a continuous segment of address space. This facilitates one-time access to a physical memory page within a required access length starting from a start address of a virtual address space corresponding to the to-be-accessed object file, with no need to search a software layer for corresponding virtual addresses of different physical memory pages for multiple times. In this way, the file can be sequentially accessed, and a file access speed can be improved. Further, a switch between a virtual address and a physical address of the object file can be transparently completed using a memory management unit (MMU). This facilitates improving the file access speed and reducing software running overheads. It should be understood that the object file may be also continuously accessed using the second virtual address space and a load/store instruction of a central processing unit (CPU).

In this embodiment of the present disclosure, an object file is mapped to a continuous segment of virtual address space in user space. On the one hand, the file can be accessed in the user space, and system call times can be reduced. On the other hand, a file access rate and file access efficiency can be effectively improved.

According to the file access method in this embodiment of the present disclosure, second physical address space that is in first physical address space and stores an object file may be determined according to first virtual address space and a first mapping relationship between the first virtual address space of user space and the first physical address space storing a file system. Continuous second virtual address space is allocated to the object file. Then, a second mapping relationship between the second physical address space and the second virtual address space is established. The object file is accessed according to the second virtual address space and the second mapping relationship. Therefore, a case in which a system call is frequently generated during file access in the prior art is avoided, and the file can be directly accessed in the user space, thereby avoiding that the system call is frequently generated during file access in the prior art. This can effectively reduce software running overheads during file access and improve a file access speed.

With reference to FIG. 4A and FIG. 4B, the following describes a file access method 3000 provided according to another embodiment of the present disclosure. It should be noted that a file access request of a process is used as an example in FIG. 4A and FIG. 4B for description. It may be understood that the method 3000 may be applied to any scenario in which a process requests to access a file. As shown in FIG. 4A and FIG. 4B, the method 3000 includes the following steps.

S3001. Establish, in kernel space, a preset first mapping relationship between first virtual address space and first physical address space, and store, in a process page table corresponding to the kernel space, a mapping page table corresponding to the first mapping relationship, where the first virtual address space is a part of user space of an operating system, and the first physical address space is a part of memory space.

Specifically, during system initialization, the first mapping relationship (as shown in FIG. 1-*a* and FIG. 1-*b*) between the first virtual address space and the first physical address space is established, and the mapping page table corresponding to the first mapping relationship is stored in the process page table corresponding to the kernel space. For example, the mapping page table corresponding to the first mapping relationship is stored in a public page global directory of the kernel space.

It should be understood that the first physical address space needs to be initialized before the first mapping relationship between the first virtual address space and the first physical address space is established in the kernel space in S3001. Specifically, after the system is started, if the first physical address space has been predefined, whether data stored at a header location of the predefined physical address space meets a physical structure organization manner of a file system is checked. If the data stored at the header location of the predefined physical address space meets the physical structure organization manner of the file system, the first physical address space does not need to be initialized. If the data stored at the header location of the predefined physical address space does not meet the physical structure organization manner of the file system, the first physical address space is initialized. If the physical address space is a blank memory area, the blank memory area is initialized according to the physical structure organization manner of the file system. For example, the physical memory area is formatted according to factors such as a size of the first physical address space and a data organization structure of the file system. For example, data structures such as a superblock and an index node are established to organize and manage the physical memory area (that is, the first physical address space).

S3002. Receive a file access request from a process, where the file access request includes a file identifier, and the file identifier is used to indicate a to-be-accessed object file. S3002 is the same as S210 shown in FIG. 2. For brevity, details are not described herein again.

S3003. Determine that a process page table corresponding to the first virtual address space does not record the first mapping relationship.

Specifically, after the file access request is received from the process, when the first virtual address space is accessed in the user space, it is determined that an entry that records the first mapping relationship is absent from the process page table corresponding to the first virtual address space.

S3004. Link, to the process page table corresponding to the first virtual address space, the mapping page table that is stored in the kernel space and corresponding to the first mapping relationship.

Specifically, a switch from the user space to the kernel space is performed, and the mapping page table that is stored in the kernel space and corresponding to the first mapping relationship is linked to the process page table corresponding to the first virtual address space, so that a file is accessed in the user space subsequently according to the first virtual address space and the first mapping relationship.

S3006. Access the first physical address space according to the first virtual address space and the first mapping relationship. S3006 is the same as S220 shown in FIG. 2. Details are not described herein again.

S3007. Obtain, from the first physical address space, an index node of the object file according to the file identifier of the object file, where the index node includes information about a file page table of the object file. S3007 is the same as S230 shown in FIG. 2. Details are not described herein again.

S3008. Obtain the file page table of the object file according to the information that is about the file page table of the object file and included in the index node, where the file page table records second physical address space of a data page that is of the object file and stored in the first physical address space, and the data page of the object file is used to store file data. S3008 is the same as S240 shown in FIG. 2. Details are not described herein again.

S3009. Allocate second virtual address space to the object file, where the second virtual address space is a part of sharing space that is in the user space of the operating system and allocated to all processes, and the second virtual address space is continuous address space. S3009 is the same as S250 described in FIG. 2. Details are not described herein again.

S3010. Establish a second mapping relationship between the second physical address space and the second virtual address space. S3010 is the same as S260 described in FIG. 2. Details are not described herein again.

S3011. Access the object file in the second physical address space according to the second virtual address space and the second mapping relationship. S3011 is the same as S270 described in FIG. 2. Details are not described herein again.

According to the file access method in this embodiment of the present disclosure, if it is determined that the process page table corresponding to the first virtual address space does not record the first mapping relationship, a page fault needs to be performed, that is, a switch from the user space to the kernel space is performed. The mapping page table corresponding to the first mapping relationship is linked to the process page table corresponding to the first virtual address space. If it is determined that the process page table corresponding to the first virtual address space records the first mapping relationship, the first physical address space storing the file system is accessed according to the first mapping relationship and the first virtual address space, and then the file in the file system is accessed. It should be noted that in this embodiment of the present disclosure, the first virtual address space is space that is in the user space and shared by all processes. For all file access requests of all the processes, requested object files may be directly accessed in the user space.

It should be understood that in this embodiment of the present disclosure, after the first mapping relationship between the first virtual address space and the first physical address space is linked to the first virtual address space, if the system is not shut down, the process page table corresponding to the first virtual address space permanently stores the entry that records the first mapping relationship, and subsequently, any process can access a file in the user space based on the first virtual address space.

In comparison with the prior art, according to the file access method in this embodiment of the present disclosure, a file may be accessed in user space, and system call times can be greatly reduced, so that software running overheads during file access can be effectively reduced, and a file access speed and file access efficiency can be effectively improved.

It should be understood that the technical solutions provided in this embodiment of the present disclosure may be applied to a Linux operating system, and may be also applied to another operating system in which each process has exclusive space of the process.

It should be further understood that sequence numbers of the foregoing processes do not mean execution sequences in various embodiments of the present disclosure. The execution sequences of the processes should be determined according to functions and internal logic of the processes, and should not be construed as any limitation on the implementation processes of the embodiments of the present disclosure.

Figure 5:
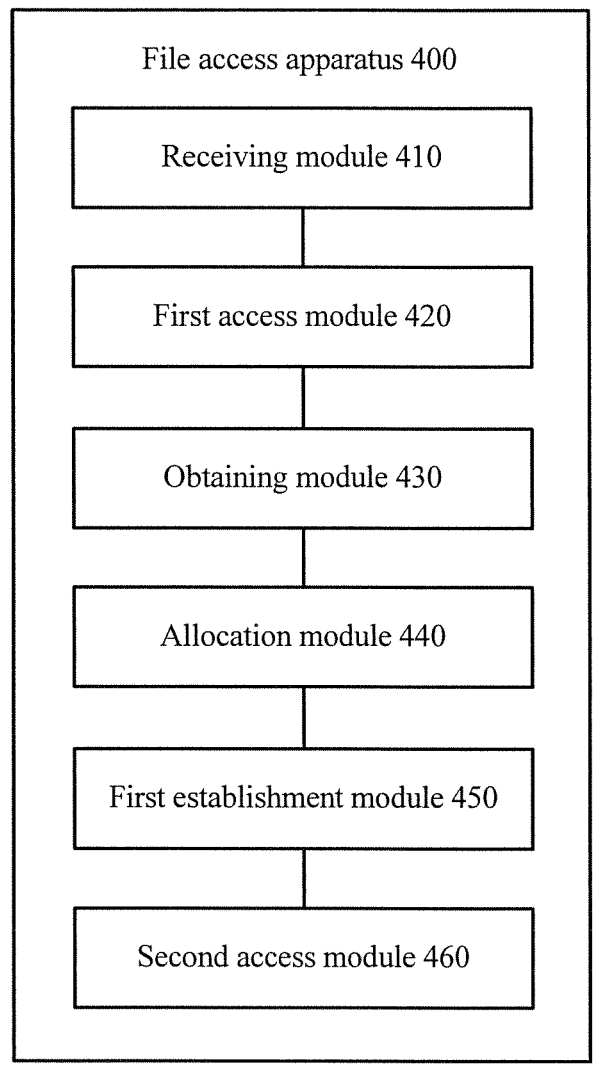
FIG. 5 is a schematic structural block diagram of a file access apparatus according to an embodiment of the present disclosure.
Figure 6:
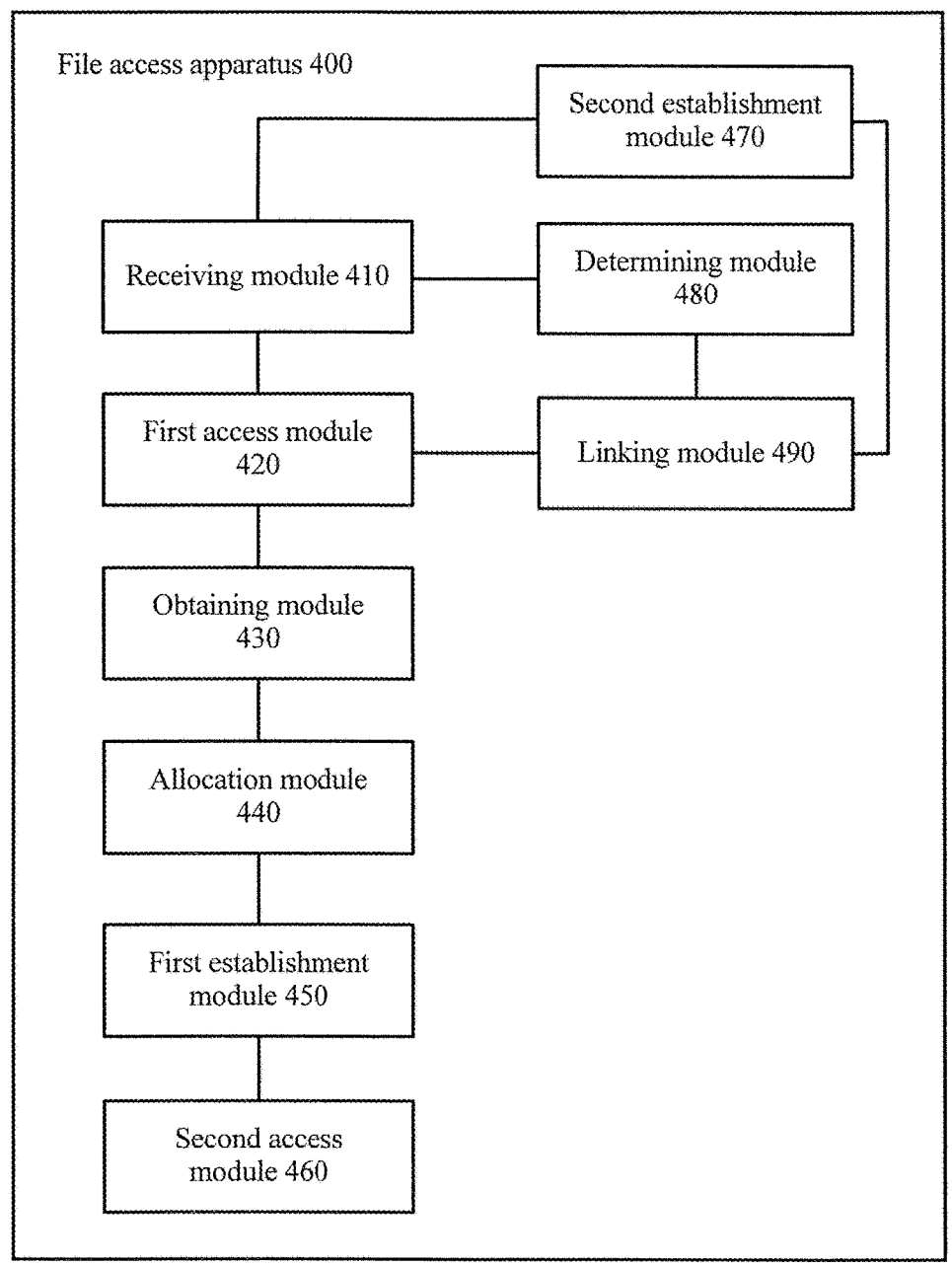
FIG. 6 is a schematic structural block diagram of another file access apparatus according to an embodiment of the present disclosure.

With reference to FIG. 1 to FIG. 4B, the foregoing describes in detail the file access method according to the embodiments of the present disclosure. With reference to FIG. 5 and FIG. 6, the following describes in detail a file access apparatus according to the embodiments of the present disclosure.

FIG. 5 shows a schematic block diagram of a file access apparatus 400 according to an embodiment of the present disclosure. The apparatus 400 includes a receiving module 410, a first access module 420, an obtaining module 430, an allocation module 440, a first establishment module 450, and a second access module 460.

The receiving module 410 is configured to receive a file access request from a process. The file access request includes a file identifier, and the file identifier is used to indicate a to-be-accessed object file.

The first access module 420 is configured to access first physical address space according to preset first virtual address space and a preset first mapping relationship between the first virtual address space and the first physical address space storing a file system. The first virtual address space is a part of user space of an operating system, and the first physical address space is a part of memory space.

The obtaining module 430 is configured to obtain, from the first physical address space, an index node of the object file according to the file identifier that is of the object file and received by the receiving module. The index node includes information about a file page table of the object file.

The obtaining module 430 is further configured to obtain the file page table of the object file according to the information that is about the file page table of the object file and included in the index node. The file page table records second physical address space of a data page that is of the object file and stored in the first physical address space, and the data page of the object file is used to store file data.

The allocation module 440 is configured to allocate second virtual address space to the object file. The second virtual address space is a part of sharing space that is in the user space of the operating system and allocated to all processes, and the second virtual address space is continuous address space.

The first establishment module 450 is configured to establish a second mapping relationship between the second physical address space and the second virtual address space allocated by the allocation module.

The second access module 460 is configured to access the object file in the second physical address space according to the second virtual address space allocated by the allocation module and the second mapping relationship established by the first establishment module 450.

According to the file access apparatus in this embodiment of the present disclosure, second physical address space that is in first physical address space and stores an object file may be determined according to first virtual address space and a first mapping relationship between the first virtual address space of user space and the first physical address space storing a file system. Continuous second virtual address space is allocated to the object file. Then, a second mapping relationship between the second physical address space and the second virtual address space is established. The object file is accessed according to the second virtual address space and the second mapping relationship. Therefore, a case in which a system call is frequently generated during file access in the prior art is avoided, and the file can be directly accessed in the user space, thereby avoiding that the system call is frequently generated during file access in the prior art. This can effectively reduce software running overheads during file access and improve a file access speed.

Optionally, in an embodiment, the first establishment module 450 is specifically configured to establish the second mapping relationship by linking the file page table of the object file to a process page table corresponding to the second virtual address space.

Optionally, in an embodiment, the second virtual address space allocated by the allocation module 440 is greater than the second physical address space.

The second access module 460 is specifically configured to:

perform a read operation on the object file in the second physical address space according to the second virtual address space and the second mapping relationship; and end the read operation when a virtual address corresponding to data to be read during the read operation exceeds virtual address space corresponding to the object file.

Optionally, in an embodiment, the second virtual address space allocated by the allocation module 440 is greater than the second physical address space.

The second access module 460 is specifically configured to:

perform a write operation on the object file in the second physical address space according to the second virtual address space and the second mapping relationship; and end the write operation when a virtual address corresponding to data to be written during the write operation exceeds the second virtual address space.

As shown in FIG. 6, optionally, in an embodiment, the apparatus 400 includes a second establishment module 470, a receiving module 410, a determining module 480, a linking module 490, a first access module 420, an obtaining module 430, an allocation module 440, a first establishment module 450, and a second access module 460.

The second establishment module 470 is configured to establish, in kernel space, a first mapping relationship between first virtual address space and first physical address space, and store, in a process page table corresponding to the kernel space, a mapping page table corresponding to the first mapping relationship.

The receiving module 410 is configured to receive a file access request from a process. The file access request includes a file identifier, and the file identifier is used to indicate a to-be-accessed object file.

The determining module 480 is configured to: after the receiving module 410 receives the file access request from the process, determine that a process page table corresponding to the first virtual address space does not record the first mapping relationship.

The linking module 490 is configured to link, to the process page table corresponding to the first virtual address space, the mapping page table that is stored in the kernel space and corresponding to the first mapping relationship established by the second establishment module 470.

The first access module 420 is configured to access the first physical address space according to the preset first virtual address space and the preset first mapping relationship between the first virtual address space and the first physical address space storing a file system. The first virtual address space is a part of user space of an operating system, and the first physical address space is a part of memory space.

The obtaining module 430 is configured to obtain, from the first physical address space, an index node of the object file according to the file identifier that is of the object file and received by the receiving module. The index node includes information about a file page table of the object file.

The obtaining module 430 is further configured to obtain the file page table of the object file according to the information that is about the file page table of the object file and included in the index node. The file page table records second physical address space of a data page that is of the object file and stored in the first physical address space, and the data page of the object file is used to store file data.

The allocation module 440 is configured to allocate second virtual address space to the object file. The second virtual address space is a part of sharing space that is in the user space of the operating system and allocated to all processes, and the second virtual address space is continuous address space.

The first establishment module 450 is configured to establish a second mapping relationship between the second physical address space and the second virtual address space allocated by the allocation module.

The second access module 460 is configured to access the object file in the second physical address space according to the second virtual address space allocated by the allocation module and the second mapping relationship established by the first establishment module.

It should be understood that the second establishment module 470 establishes the first mapping relationship in the kernel space before the receiving module 410 receives the file access request. It should be further understood that the first access module 420 accesses the first physical address space according to the first virtual address space and the first mapping relationship when the linking module 490 links, to the process page table corresponding to the first virtual address space, the mapping page table that is stored in the kernel space and corresponding to the first mapping relationship.

It should be understood that the foregoing or other operations and/or functions of various modules of the file access apparatus 400 according to this embodiment of the present disclosure are separately used to implement corresponding processes of each method in FIG. 2, FIG. 4A, and FIG. 4B. For brevity, details are not described herein again.

According to the file access apparatus in this embodiment of the present disclosure, second physical address space that is in first physical address space and stores an object file may be determined according to first virtual address space and a first mapping relationship between the first virtual address space of user space and the first physical address space storing a file system. Continuous second virtual address space is allocated to the object file. Then, a second mapping relationship between the second physical address space and the second virtual address space is established. The object file is accessed according to the second virtual address space and the second mapping relationship. Therefore, a case in which a system call is frequently generated during file access in the prior art is avoided, and the file can be directly accessed in the user space, thereby avoiding that the system call is frequently generated during file access in the prior art. This can effectively reduce software running overheads during file access and improve a file access speed.

Figure 7:
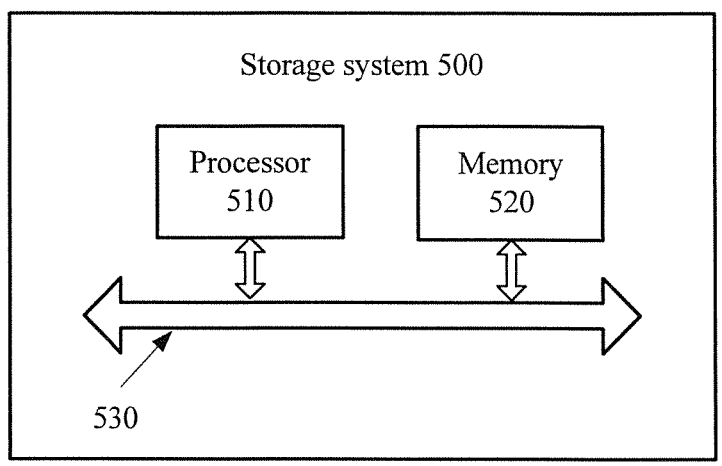
FIG. 7 is a schematic structural block diagram of a storage system according to an embodiment of the present disclosure.

As shown in FIG. 7, an embodiment of the present disclosure further provides a storage system 500. The storage system 500 includes a processor 510, a memory 520, and a bus system 530. The processor 510 and the memory 520 are connected using the bus system 530. The memory 520 is configured to store a file and a program. The processor 510 is configured to execute the program stored in the memory 520. The processor 510 invokes, using the bus system 530, code stored in the memory 520 to: receive a file access request from a process, where the file access request includes a file identifier, and the file identifier is used to indicate a to-be-accessed object file; access first physical address space according to preset first virtual address space and a preset first mapping relationship between the first virtual address space and the first physical address space storing a file system, where the first virtual address space is a part of user space of an operating system, and the first physical address space is a part of memory space; obtain, from the first physical address space, an index node of the object file according to the file identifier of the object file, where the index node includes information about a file page table of the object file; obtain the file page table of the object file according to the information that is about the file page table of the object file and included in the index node, where the file page table records second physical address space of a data page that is of the object file and stored in the first physical address space, and the data page of the object file is used to store file data; allocate second virtual address space to the object file, where the second virtual address space is a part of sharing space that is in the user space of the operating system and allocated to all processes, and the second virtual address space is continuous address space; establish a second mapping relationship between the second physical address space and the second virtual address space; and access the object file in the second physical address space according to the second virtual address space and the second mapping relationship.

According to the storage system in this embodiment of the present disclosure, second physical address space that is in first physical address space and stores an object file may be determined according to first virtual address space and a first mapping relationship between the first virtual address space of user space and the first physical address space storing a file system. Continuous second virtual address space is allocated to the object file. Then, a second mapping relationship between the second physical address space and the second virtual address space is established. The object file is accessed according to the second virtual address space and the second mapping relationship. Therefore, a case in which a system call is frequently generated during file access in the prior art is avoided, and the file can be directly accessed in the user space, thereby avoiding that the system call is frequently generated during file access in the prior art. This can effectively reduce software running overheads during file access and improve a file access speed.

Optionally, the processor 510 is specifically configured to establish the second mapping relationship by linking the file page table of the object file to a process page table corresponding to the second virtual address space.

Optionally, the second virtual address space is greater than the second physical address space. The processor 510 is specifically configured to: perform a read operation on the object file in the second physical address space according to the second virtual address space and the second mapping relationship; and end the read operation when a virtual address corresponding to data to be read during the read operation exceeds virtual address space corresponding to the object file.

Optionally, the second virtual address space is greater than the second physical address space. The processor 510 is specifically configured to: perform a write operation on the object file in the second physical address space according to the second virtual address space and the second mapping relationship; and end the write operation when a virtual address corresponding to data to be written during the write operation exceeds the second virtual address space.

Optionally, the processor 510 is further configured to: establish, in kernel space, the first mapping relationship between the first virtual address space and the first physical address space, and store, in a process page table corresponding to the kernel space, a mapping page table corresponding to the first mapping relationship; after the file access request is received from the process, determine that the process page table corresponding to the first virtual address space does not record the first mapping relationship; link, to the process page table corresponding to the first virtual address space, the mapping page table that is stored in the kernel space and corresponding to the first mapping relationship.

It should be understood that, in this embodiment of the present disclosure, the processor 510 may be a central processing unit (CPU), or the processor 510 may be another general-purpose processor, a digital signal processor (DSP), an application-specific integrated circuit (ASIC), a field programmable gate array (FPGA) or another programmable logic device, a transistor logic device, a hardware component, or the like. The general-purpose processor may be a microprocessor, or the processor may be any conventional processor, or the like.

The memory 520 may include a read-only memory and a random access memory, and provides an instruction and data to the processor 510. A part of the memory 520 may further include a nonvolatile random access memory. For example, the memory 520 may further store infatuation such as a device type.

In addition to a data bus, the bus system 530 may further include a power bus, a control bus, a status signal bus, and the like. However, for clear description, various types of buses in the figure are marked as the bus system 530.

In an implementation process, the steps in the foregoing methods may be completed by means of an integrated logic circuit of hardware in the processor 510 or an instruction in a form of software. The steps of the methods disclosed with reference to the embodiments of the present disclosure may be directly performed by a hardware processor, or may be performed using a combination of hardware and software modules in the processor. The software module may be located in a mature storage medium in the field, such as a random access memory, a flash memory, a read-only memory, a programmable read-only memory, an electrically erasable programmable memory, or a register. The storage medium is located in the memory 520. The processor 510 reads information from the memory 520, and completes the steps of the foregoing methods in combination with the hardware in the processor. To avoid repetition, details are not described herein again.

It should be understood that the storage system 500 according to this embodiment of the present disclosure may be corresponding to the file access apparatus 400 in the embodiment of the present disclosure, and the storage system 500 may implement the methods in FIG. 2, FIG. 4A, and FIG. 4B. For brevity, details are not described herein again.

Therefore, according to the storage system in this embodiment of the present disclosure, second physical address space that is in first physical address space and stores an object file may be determined according to first virtual address space and a first mapping relationship between the first virtual address space of user space and the first physical address space storing a file system. Continuous second virtual address space is allocated to the object file. Then, a second mapping relationship between the second physical address space and the second virtual address space is established. The object file is accessed according to the second virtual address space and the second mapping relationship. Therefore, a case in which a system call is frequently generated during file access in the prior art is avoided, and the file can be directly accessed in the user space, thereby avoiding that the system call is frequently generated during file access in the prior art. This can effectively reduce software running overheads during file access and improve a file access speed.

It should be understood that in the specification, claims, and accompanying drawings of the present disclosure, the terms "first", "second", "third", and the like are used to distinguish between different objects but are not used to describe a particular order. In addition, the terms "include", "have", or any other variant thereof, are intended to cover a non-exclusive inclusion. For example, a procedure, a method, a system, a product, or an apparatus that includes a series of steps or modules is not limited to the listed steps or modules, but optionally further includes an unlisted step or module or unit, or optionally further includes another inherent step or unit of the procedure, the method, the product, or the apparatus.

It should be understood that sequence numbers of the foregoing procedures do not mean execution sequences in various embodiments of the present disclosure. The execution sequences of the processes should be determined according to functions and internal logic of the processes, and should not be construed as any limitation on the implementation processes of the embodiments of the present disclosure.

A person of ordinary skill in the art may be aware that the units and algorithm steps of various examples described with reference to the embodiments disclosed in this specification can be implemented by electronic hardware or a combination of computer software and electronic hardware. Whether the functions are performed by means of hardware or software depends on particular applications and design constraint conditions of the technical solutions. A person skilled in the art may use different methods to implement the described functions for each particular application, but it should not be considered that the implementation goes beyond the scope of the present disclosure.

In the several embodiments provided in the present application, it should be understood that the disclosed system, apparatus, and method may be implemented in other manners. For example, the described apparatus embodiments in the foregoing are merely examples. For example, the unit division is merely logical function division and may be another division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in an electronic, mechanical, or another form.

When the functions are implemented in a form of a software function unit and sold or used as an independent product, the functions may be stored in a computer-readable storage medium. Based on such an understanding, the technical solutions of the present disclosure essentially, or the part contributing to the prior art, or a part of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of the present disclosure. The foregoing storage medium includes various non-transitory machine-readable media such as a USB flash drive, a removable hard disk, a read-only memory (ROM), a random access memory (RAM), a magnetic disk, and an optical disc that can store program code.

A person skilled in the art may clearly know that, for convenience and conciseness of description, in the foregoing embodiments, the embodiments emphasize different aspects, and for a part not described in detail in one embodiment, reference may be made to relevant descriptions of another embodiment. Features disclosed in embodiments of the present disclosure, claims, and the accompanying drawings may exist independently, or exist in a combination. Features described in a form of hardware in the embodiments of the present disclosure may be executed using software, and features described in a form of software in the embodiments of the present disclosure may be executed using hardware. This is not limited herein.

What is claimed is:

1. A file access method, comprising:
   receiving a file access request from a process, wherein the file access request comprises a file identifier that indicates a to-be-accessed object file;
   accessing first physical address space according to preset first virtual address space and a preset first mapping relationship between the first virtual address space and the first physical address space storing a file system, wherein the first virtual address space is a part of user space of an operating system, and the first physical address space is a part of memory space;
   obtaining, from the first physical address space, an index node of the object file according to the file identifier of the object file, wherein the index node comprises information about a file page table of the object file;
   obtaining the file page table of the object file according to the information about the file page table of the object file and comprised in the index node, wherein the file page table records second physical address space of a data page of the object file and stored in the first physical address space, and the data page of the object file is used to store file data;
   allocating second virtual address space to the object file, wherein the second virtual address space is a part of sharing space in the user space of the operating system and allocated to all processes, and the second virtual address space is continuous address space;
   establishing a second mapping relationship between the second physical address space and the second virtual address space; and
   accessing the object file in the second physical address space according to the second virtual address space and the second mapping relationship.

2. The method according to claim 1, wherein establishing a second mapping relationship between the second physical address space and the second virtual address space comprises:
   establishing the second mapping relationship by linking the file page table of the object file to a process page table corresponding to the second virtual address space.

3. The method according to claim 1, wherein:
   the second virtual address space is greater than the second physical address space; and
   accessing the object file in the second physical address space according to the second virtual address space and the second mapping relationship comprises:
      performing a read operation on the object file in the second physical address space according to the second virtual address space and the second mapping relationship, and
      ending the read operation when a virtual address corresponding to data to be read during the read operation exceeds virtual address space corresponding to the object file.

4. The method according to claim 1, wherein:
   the second virtual address space is greater than the second physical address space; and
   accessing the object file in the second physical address space according to the second virtual address space and the second mapping relationship comprises:
      performing a write operation on the object file in the second physical address space according to the second virtual address space and the second mapping relationship, and
      ending the write operation when a virtual address corresponding to data to be written during the write operation exceeds the second virtual address space.

5. The method according to claim 1, further comprising:
   establishing, in kernel space, the first mapping relationship between the first virtual address space and the first physical address space, and storing, in a process page table corresponding to the kernel space, a mapping page table corresponding to the first mapping relationship; and
   wherein after the file access request is received from the process, the method further comprises:
      determining that a process page table corresponding to the first virtual address space does not record the first mapping relationship, and
      linking, to the process page table corresponding to the first virtual address space, the mapping page table that is stored in the kernel space and corresponding to the first mapping relationship.

6. A storage system, comprising:
   a memory, configured to store a file; and
   a processor, coupled to the memory and configured to:

receive a file access request from a process, wherein the file access request comprises a file identifier that indicates a to-be-accessed object file, access first physical address space according to preset first virtual address space and a preset first mapping relationship between the first virtual address space and the first physical address space storing a file system, wherein the first virtual address space is a part of user space of an operating system, and the first physical address space is a part of memory space, obtain, from the first physical address space, an index node of the object file according to the file identifier of the object file, wherein the index node comprises information about a file page table of the object file, obtain the file page table of the object file according to the information about the file page table of the object file and comprised in the index node, wherein the file page table records second physical address space of a data page of the object file and stored in the first physical address space, and the data page of the object file is used to store file data, allocate second virtual address space to the object file, wherein the second virtual address space is a part of sharing space in the user space of the operating system and allocated to all processes, and the second virtual address space is continuous address space, establish a second mapping relationship between the second physical address space and the second virtual address space, and access the object file in the second physical address space according to the second virtual address space and the second mapping relationship.

7. The storage system according to claim 6, wherein the processor is configured to:
establish the second mapping relationship by linking the file page table of the object file to a process page table corresponding to the second virtual address space.

8. The storage system according to claim 6, wherein:
the second virtual address space is greater than the second physical address space; and
the processor is configured to:
perform a read operation on the object file in the second physical address space according to the second virtual address space and the second mapping relationship, and
end the read operation when a virtual address corresponding to data to be read during the read operation exceeds virtual address space corresponding to the object file.

9. The storage system according to claim 6, wherein:
the second virtual address space is greater than the second physical address space; and
the processor is configured to:
perform a write operation on the object file in the second physical address space according to the second virtual address space and the second mapping relationship, and
end the write operation when a virtual address corresponding to data to be written during the write operation exceeds the second virtual address space.

10. The storage system according to claim 6, wherein the processor is further configured to:
establish, in kernel space, the first mapping relationship between the first virtual address space and the first physical address space, and store, in a process page table corresponding to the kernel space, a mapping page table corresponding to the first mapping relationship;
after the file access request is received from the process, determine that a process page table corresponding to the first virtual address space does not record the first mapping relationship; and
link, to the process page table corresponding to the first virtual address space, the mapping page table that is stored in the kernel space and corresponding to the first mapping relationship.

11. A non-transitory computer-readable storage medium comprising instructions which, when executed by a computer, cause the computer to:
receive a file access request from a process, wherein the file access request comprises a file identifier that indicates a to-be-accessed object file;
access first physical address space according to preset first virtual address space and a preset first mapping relationship between the first virtual address space and the first physical address space storing a file system, wherein the first virtual address space is a part of user space of an operating system, and the first physical address space is a part of memory space;
obtain, from the first physical address space, an index node of the object file according to the file identifier of the object file, wherein the index node comprises information about a file page table of the object file;
obtain the file page table of the object file according to the information about the file page table of the object file and comprised in the index node, wherein the file page table records second physical address space of a data page of the object file and stored in the first physical address space, and the data page of the object file is used to store file data;
allocate second virtual address space to the object file, wherein the second virtual address space is a part of sharing space in the user space of the operating system and allocated to all processes, and the second virtual address space is continuous address space;
establish a second mapping relationship between the second physical address space and the second virtual address space; and
access the object file in the second physical address space according to the second virtual address space and the second mapping relationship.

12. The non-transitory computer-readable storage medium according to claim 11 comprising instructions which, when executed by the computer, cause the computer to:
establish the second mapping relationship by linking the file page table of the object file to a process page table corresponding to the second virtual address space.

13. The non-transitory computer-readable storage medium according to claim 11 comprising instructions which, when executed by the computer, cause the computer to:
perform a read operation on the object file in the second physical address space according to the second virtual address space and the second mapping relationship, wherein the second virtual address space is greater than the second physical address space; and
end the read operation when a virtual address corresponding to data to be read during the read operation exceeds virtual address space corresponding to the object file.

14. The non-transitory computer-readable storage medium according to claim 11 comprising instructions which, when executed by the computer, cause the computer to:
- perform a write operation on the object file in the second physical address space according to the second virtual address space and the second mapping relationship, wherein the second virtual address space is greater than the second physical address space; and
- end the write operation when a virtual address corresponding to data to be written during the write operation exceeds the second virtual address space.

15. The non-transitory computer-readable storage medium according to claim 11, comprising instructions which, when executed by the computer, cause the computer to:
- establish, in kernel space, the first mapping relationship between the first virtual address space and the first physical address space, and store, in a process page table corresponding to the kernel space, a mapping page table corresponding to the first mapping relationship; and
- link, to a process page table corresponding to the first virtual address space, the mapping page table that is stored in the kernel space and corresponding to the first mapping relationship after the file access request is received from the process and when the process page table corresponding to the first virtual address space does not record the first mapping relationship.

* * * * *